United States Patent
Jerebko

(10) Patent No.: US 7,920,730 B2
(45) Date of Patent: Apr. 5, 2011

(54) AUTOMATIC BONE DETECTION IN MRI IMAGES

(75) Inventor: Anna Jerebko, West Chester, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 1067 days.

(21) Appl. No.: 11/542,501

(22) Filed: Oct. 3, 2006

(65) Prior Publication Data

US 2007/0081713 A1  Apr. 12, 2007

Related U.S. Application Data

(60) Provisional application No. 60/724,391, filed on Oct. 7, 2005.

(51) Int. Cl.
*G06K 9/00* (2006.01)

(52) U.S. Cl. .................. 382/128; 382/131; 382/294

(58) Field of Classification Search .......... 382/128, 382/130–132, 284, 294, 190
See application file for complete search history.

(56) References Cited

U.S. PATENT DOCUMENTS

| 5,879,301 A * | 3/1999 | Chiabrera et al. ........... 600/437 |
| 6,021,213 A | 2/2000 | Helterbrand et al. |
| 2005/0010106 A1 * | 1/2005 | Lang et al. .................... 600/425 |
| 2005/0018895 A1 * | 1/2005 | Kawano ........................ 382/132 |
| 2006/0122486 A1 * | 6/2006 | Tamez-Pena et al. ......... 600/410 |
| 2006/0204067 A1 * | 9/2006 | Tuma et al. ................... 382/128 |
| 2007/0041639 A1 * | 2/2007 | Von Berg et al. ............. 382/173 |

FOREIGN PATENT DOCUMENTS

WO   WO 2004/086972 A2   10/2004

OTHER PUBLICATIONS

Gomberg et al., "Method for Cortical Bone Structural Analysis From Magnetic Resonance Images", Academic Radiology, Reston, VA, US, vol. 12, No. 10, Oct. 2005, pp. 1320-1332.
Cortet et al., "In Vivo Comparison Between Computed Tomography and Magnetic Resonance Image Analysis of the Distal Radius in the Assessment of Osteoporosis", Journal of Clinical Densitometry, Humana Press, Totowa, NJ, US, vol. 3, No. 1, Apr. 2000, pp. 15-26.
Zoroofi et al., "Automated Segmentation of Necrotic Femoral Head From 3D MR Data", Computerized Medical Imaging and Graphics: The Official Journal of the Computerized Medical Imaging Society Jul. 2004, vol. 28, No. 5, Jul. 2004, pp. 267-278.

* cited by examiner

*Primary Examiner* — John B Strege
(74) *Attorney, Agent, or Firm* — Peter Withstandley

(57) ABSTRACT

A method for detecting bone and bone disease using MRI images includes: detecting and segmenting bone borders using dark bone border intensity information from an MRI image; and detecting bone disease within a segmented image region.

12 Claims, 3 Drawing Sheets

---

Detect and Segment Bone Borders Using Dark Bone Border Intensity Information from an MRI Image — 210

Build a Model of a Bone Using the Segmented Bone Borders and Use the Model of the Bone to Detect Bone Disease — 220

Detect Bone Disease within a Segmented Image Region — 230

Dark bone border

AUTOMATIC BONE DETECTION IN MRI IMAGES

CROSS-REFERENCE TO RELATED APPLICATION

This application claims the benefit of U.S. Provisional Application Ser. No. 60/724,391, filed Oct. 7, 2005 and entitled "Method and Apparatus for Automatic Bone and Bone Metastasis Detection in MRI Images," the content of which is herein incorporated by reference in its entirety.

BACKGROUND OF THE INVENTION

1. Technical Field

The present disclosure relates to systems and methods for automatic bone detection in MRI images.

2. Discussion of Related Art

In recent years, medical imaging has experienced an explosive growth due to advances in imaging modalities such as X-rays, computed tomography (CT), magnetic resonance imaging (MRI) and ultrasound. MRI has demonstrated a high potential in bone metastasis identification at an early stage of growth. While MRI offers excellent tissue discrimination and can provide diagnostic quality images, automatic segmentation and classification of tissues in MRI images is difficult due to intra- and inter-scan intensity inhomogeneities. In addition to the high intensity variability within a single tissue type, in MRI images, several tissue types appear to have similar intensity and textural properties, making it harder to design automatic segmentation tools. For example the bone intensity and texture looks very similar to many soft tissues.

Bone consists of cortical or compact bone, trabecular bone and marrow. The compact bone surrounds trabecular bone (also called cancellous or spongy bone) which surrounds the marrow cavity. Compact bone forms the thick-walled shaft of long bones, such as the femur, tibia, fibula, ulna, radius and humerus. A thin layer of compact bone also covers the ends of long bones. Periosteum, which is a dense fibrous membrane that serves as an attachment for tendons and muscles, covers the surface of bones, except at their extremities. MRI can provide detailed images of the bone and bone marrow and is at least as sensitive as CT or X-rays for detecting bone marrow metastases. T1- or T2-weighted STIR (short tau-inversion recovery) images can be a component of an MR exam.

Although bone marrow lesions may be more accurately assessed by MRI than by other imaging modalities, MRI is less effective than X-rays or CT for detecting destruction of bone structure, because cortical bone does not produce a signal and appears black on T1- and T2-weighted sequences.

SUMMARY OF THE INVENTION

According to an exemplary embodiment of the present invention, a method is provided for detecting bone in magnetic resonance imaging (MRI) images. The method includes detecting bone borders using dark bone border intensity information from an MRI image, wherein dark bone border intensity information comprises low or zero signal intensity in MRI images. According to an exemplary embodiment of the present invention, a method is provided for detecting bone and bone disease using MRI images. The method includes: detecting and segmenting bone borders using dark bone border intensity information from an MRI image; and detecting bone disease within a segmented image region.

According to an exemplary embodiment of the present invention, a system for detecting bone and bone disease in MRI images comprises: a memory device for storing a program; a processor in communication with the memory device, the processor operative with the program to: detect and segment bone borders using dark bone border intensity information from an MRI image; and detect bone disease within a segmented image region.

According to an exemplary embodiment of the present invention, a system for providing automatic bone detection in MRI images comprises a module for automatically detecting and segmenting bone borders using dark bone border intensity information from an MRI image.

According to an exemplary embodiment of the present invention, a method of registering MRI images includes registering MRI images using dark bone border intensity information from an MRI image.

BRIEF DESCRIPTION OF THE DRAWINGS

The present invention will become more apparent to those of ordinary skill in the art when descriptions of exemplary embodiments thereof are read with reference to the accompanying drawings.

DESCRIPTION OF EXEMPLARY EMBODIMENTS

Figure 1:
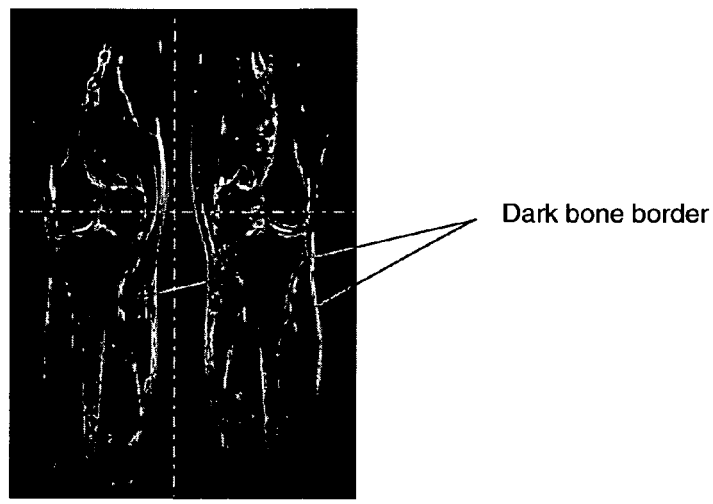
FIG. 1 shows examples of periosteum and cortical bone in MRI images.

Hereinafter, exemplary embodiments of the present invention will be described in detail with reference to the accompanying drawings.

In exemplary embodiments of the present invention, black border around bones in magnetic resonance imaging (MRI) images is extracted and used to represent bone contour. For example, cortical bone and periosteum appear consistently dark on HASTE, T1 and T2 STIR (short tau-inversion recovery) MRI images. Intensity normalization can be used as a preprocessing step.

After the bone border is extracted, bone metastases can be detected as dark spots inside the bone, such as in the case of a T1 pulse sequence, or as bright spots, in the case of a T2 STIR pulse sequence. Further classification step using additional features may be included to automatically detect bone metastases sites and/or to help to discriminate them from false positive findings.

In a method of detecting bone in magnetic resonance imaging (MRI) images, according to an exemplary embodiment of the present invention, bone borders are detected using dark bone border intensity information from an MRI image. Dark bone border intensity information may comprise low or zero signal intensity in MRI images, and dark bone border may comprise cortical bone, compact bone and/or periosteum. The bone may be a long bone, a short bone, a flat bone or an irregular bone. In an exemplary embodiment of the present invention, the bone is a long bone. The characteristics associated with long bones include a tubular shaft and articular surface at each end. For example, the major bones of the arms and legs are long bones. Long bones include: femur, tibia, fibula (paired), ulna (paired), radius and humerus. In an exemplary embodiment of the present invention, the bone is an irregular bone. Irregular bones include, for example, the entire vertebral column including coccygeals bones.

Detecting bone in MRI images may include using thresholding, machine learning based classification, clustering, region growing, deformable models, snakes, live-wire methods, edge detection and/or connected components to detect bone borders. Thresholding can be defined as a non-linear operation that converts a gray-scale image into a binary image where the two levels are assigned to pixels that are above or below a predetermined threshold value. For example, thresholding may include the following steps: first, remove the background, leaving only the patient body voxels; second, remove all the voxels above the specified threshold value. The threshold value may be determined experimentally. Voxels that do not belong to the skeletal structure can be removed by further classification with additional features calculated in and around extracted dark voxels. Region growing, deformable models, snakes, live-wire methods, etc. can be used to trace the bone border which is constructed of dark voxels, incorporating intensity information and statistics inside and outside the dark border if necessary.

Image registration or fusion methods can be used to extract the bones by registering the dark bone border to a model or to another patient bone, incorporating intensity information and statistics inside and outside the dark border if necessary. Image transforms can be used for extracting bone borders of a particular shape. For example, Hough or Radon transforms can be used for extracting bone borders of a particular shape.

Figure 2:
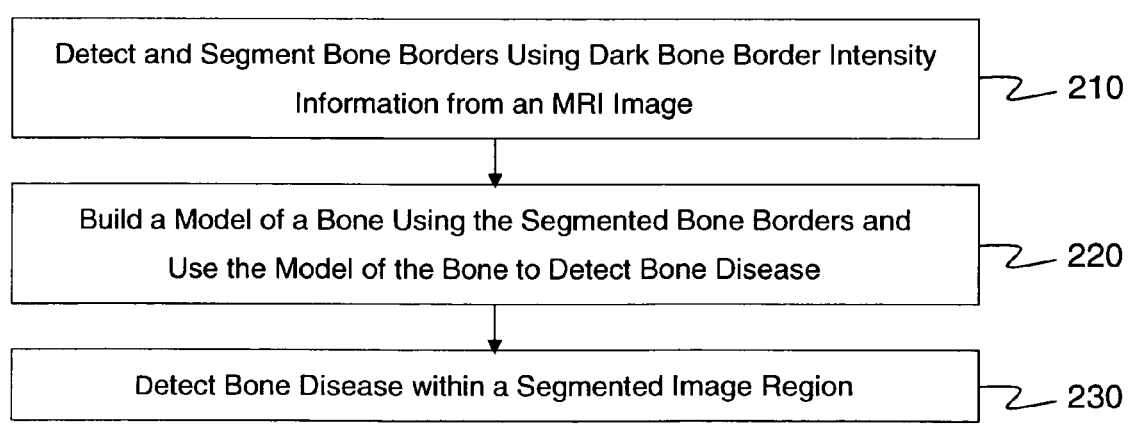
FIG. 2 is a flowchart showing a method of detecting bone and bone disease using magnetic resonance imaging (MRI) images, according to an exemplary embodiment of the present invention.

FIG. 2 is a flowchart showing a method of detecting bone and bone disease using magnetic resonance imaging (MRI) images, according to an exemplary embodiment of the present invention. Referring to FIG. 2, in step 210, detect and segment bone borders using dark bone border intensity information from an MRI image. For example, detection of bone borders in an MRI image or image sequence may comprise feature detection and classification. Dark bone border intensity information may comprise low or zero signal intensity in MRI images, and dark bone border may comprise cortical bone, compact bone and/or periosteum.

In an optional step 220, a model of a bone is built using the segmented bone borders, and the model of the bone is used to detect bone disease. For example, the model may be two-dimensional or three-dimensional model. The model may be a statistical model, such as a bone location probability map extracted from training samples. The model may be an anatomical model, such as a model describing bone border, texture and intensity. The model may be a parametric model, such as a slant cone segment or cylinder model for long bones and vertebrae body. Building the model may comprise extracting geometric primitives from the detected bone borders, model fitting using random sample consensus, registration, expectation-maximization, least-squares and/or exhaustive search algorithms.

In step 230, detect bone disease within a segmented image region. In an exemplary embodiment of the present invention, thresholding, machine learning based classification, clustering, region growing, deformable models, snakes, live-wire methods, edge detection and/or connected components are used to detect and segment bone borders. For example, thresholding may comprise adaptive global thresholding, non-adaptive global thresholding, local thresholding and/or local adaptive thresholding.

Figure 3A:
FIG. 3 illustrates the results of the use of Hough transform for long bone border extraction, according to an exemplary embodiment of the present invention.
Figure 3B:
Figure 4:
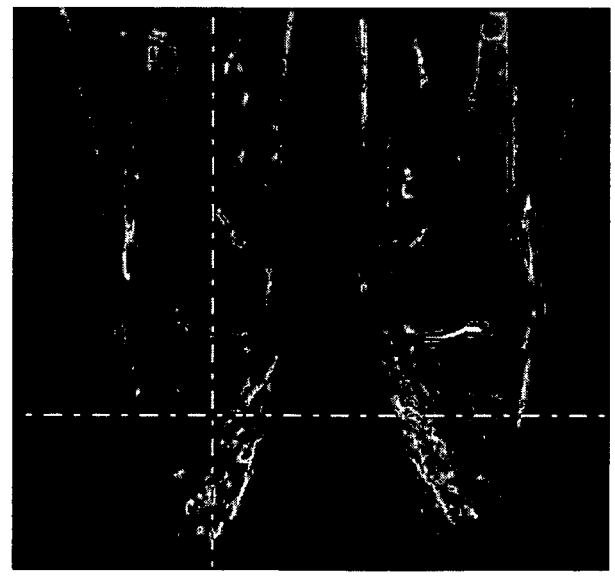
FIG. 4 shows examples of detected bone metastases in femur bones, according to an exemplary embodiment of the present invention.

The bone may be a long bone and extracting geometric primitives may include extracting lines through Hough transform and/or Radon transform. FIG. 3 illustrates the results of the use of Hough transform for long bone border extraction, according to an exemplary embodiment of the present invention. It is to be understood that various image transforms can be used for extracting bone borders.

Detecting bone disease may comprise detecting abnormalities, bone metastasis, fractures, osteoporosis, Shmorl's nodes, osteochondrosis, edemas, inflammation, cysts, hemangiomas, arthrosis and/or bone infarct. In an exemplary embodiment of the present invention, a method of registering MRI images includes registering MRI images using dark bone border intensity information from an MRI image. Dark bone border intensity information may comprise low or zero signal intensity in MRI images, and dark bone border may comprise cortical bone, compact bone and/or periosteum The bone may be a long bone, a short bone, a flat bone or an irregular bone. In an exemplary embodiment of the present invention, the bone is a long bone.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 5:
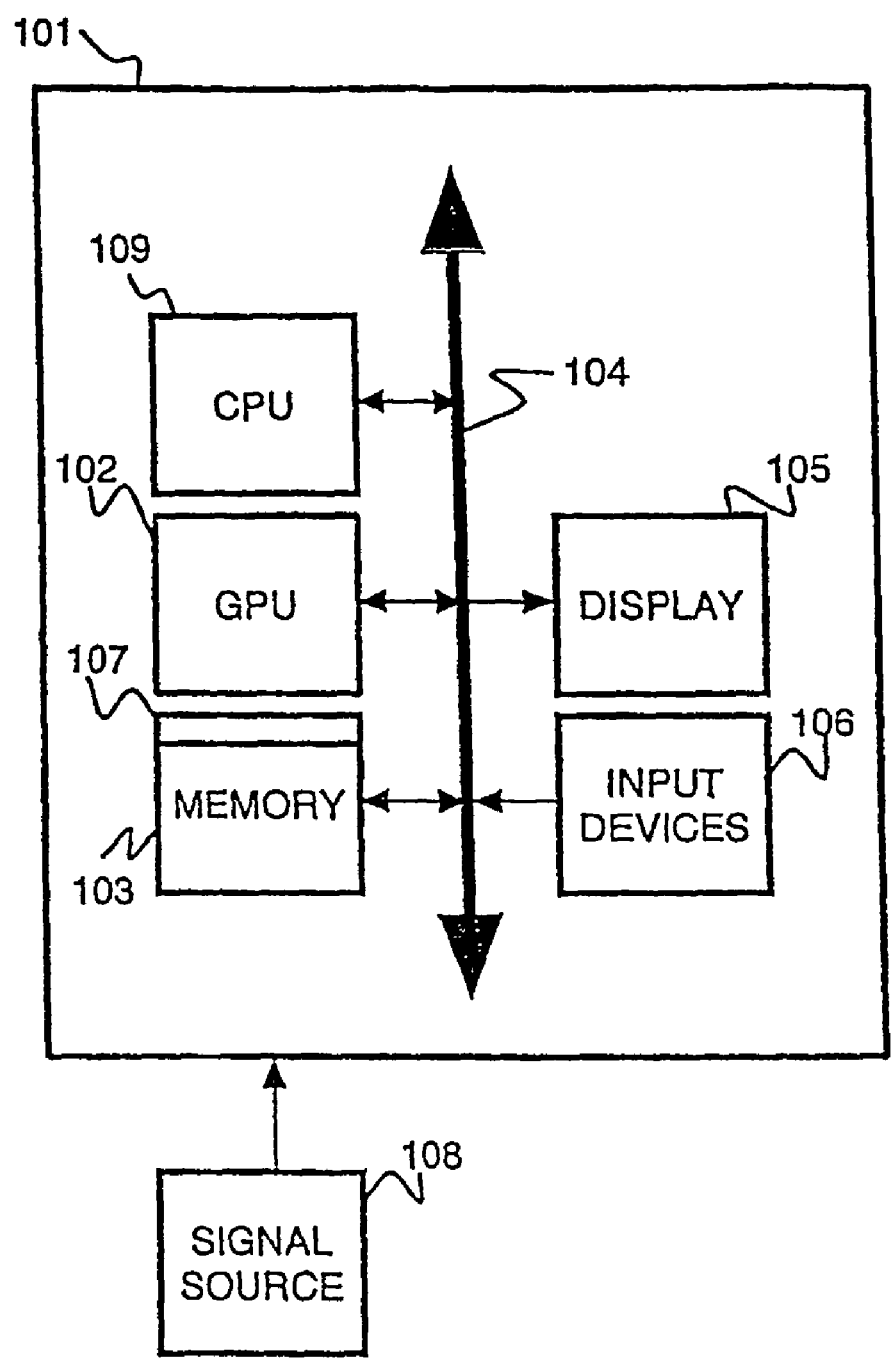
FIG. 5 illustrates a computer system for implementing a method of detecting bone in MRI images, according to an exemplary embodiment of the present invention.

Referring to FIG. 5, according to an embodiment of the present disclosure, a computer system 101 for implementing a method of detecting bone in magnetic resonance imaging (MRI) images can comprise, inter alia, a central processing unit (CPU) 109, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 109 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

In an exemplary embodiment of the present invention, a system for providing automatic bone detection in MRI images comprises a memory device 103 for storing a program, and a processor 109 in communication with the memory device 103. The processor 109 is operative with the program to detect and segment bone borders using dark bone border intensity information from an MRI image. Dark bone border intensity information may comprise low or zero signal intensity in MRI images. The processor 109 may be further operative with the program to scan a patient using an MRI system to obtain data to generate an MRI image.

In an exemplary embodiment of the present invention, a system for detecting bone and bone disease in comprises a memory device 103 for storing a program, and a processor 109 in communication with the memory device 103. The processor 109 is operative with the program to detect and segment bone borders using dark bone border intensity information from an MRI image; and detect bone disease within a segmented image region.

The processor 109 may be further operative with the program to use thresholding, machine learning classification clustering, region growing, deformable models, snakes, live-wire methods, edge detection and/or connected components to detect and segment bone borders. In an exemplary embodiment of the present invention, the processor 109 is further operative with the program to build a model of a bone using the segmented bone borders, and wherein the processor is further operative with the program to use the model of the bone to detect bone disease.

The model of the bone may be two-dimensional or three-dimensional model. The model may be a statistical model, such as a bone location probability map extracted from training samples. The model may be an anatomical model, such as a model describing bone border, texture and intensity. The model may be a parametric model, such as a slant cone segment or cylinder model for long bones and vertebrae body. In an exemplary embodiment of the present invention, when building the model, the processor is further operative with the program to extract geometric primitives from the detected bone borders.

The processor 109 may be further operative with the program to scan a patient using an MRI system to obtain data to generate an MRI image.

Although exemplary embodiments of the present invention have been described in detail with reference to the accompanying drawings for the purpose of illustration, it is to be understood that the inventive processes and apparatus are not to be construed as limited thereby. It will be readily apparent to those of reasonable skill in the art that various modifications to the foregoing exemplary embodiments may be made without departing from the scope of the invention as defined by the appended claims, with equivalents of the claims to be included therein.

What is claimed is:

1. A computer system, comprising:
    a processor; and
    a program storage device readable by the computer system, embodying a program of instructions executable by the processor to perform method steps for automatically detecting and registering bone structures from magnetic resonance imaging (MRI) images, the method comprising:
    acquiring an MRI image;
    automatically detecting low or zero intensity locations within the image and extracting a bone border based upon the detected low or zero intensity locations;
    segmenting a region of the image within the extracted bone border;
    building a model of a bone using the extracted bone border and the segmented image region by extracting geometric primitives from the detected bone borders; and
    registering the extracted bone border to the model.

2. The system of claim 1, the method further comprising:
    detecting low or zero intensity locations within the image using at least one technique selected from: thresholding, machine learning based classification, clustering, region growing, deformable modeling, snaking, live-wire methods, edge detecting, and connected component detecting.

3. The system of claim 2, the method further comprising:
    detecting low or zero intensity locations within the image by thresholding, wherein thresholding comprises at least one of adaptive global thresholding, non-adaptive global thresholding, local thresholding, and local adaptive thresholding.

4. The system of claim 1, the method further comprising detecting locations of possible bone disease within the segmented region.

5. The system of claim 1, the method further comprising building the model by extracting geometric primitives by extracting lines using at least one of a Hough transform or a Radon transform.

6. The system of claim 4, wherein detecting locations of possible bone disease further comprises detecting possible locations of at least one of abnormalities, bone metastasis, fractures, osteoporosis, Shmorl's nodes, osteochondrosis, edemas, inflammation, cysts, hemangiomas, arthrosis or bone infarct.

7. A program storage device accessible by a computer, tangibly embodying a program of instructions executable by said computer to perform method steps for automatically detecting and registering bone structures from magnetic resonance imaging (MRI) images, the method comprising:
    acquiring an MRI image;
    automatically detecting low or zero intensity locations within the image and extracting a bone border based upon the detected low or zero intensity locations;
    segmenting a region of the image within the extracted bone border;
    building a model of a bone using the extracted bone border and the segmented image region by extracting geometric primitives from the detected bone borders; and
    registering the extracted bone border to the model.

8. The program storage device of claim 7, the method further comprising:
    detecting low or zero intensity locations within the image using at least one technique selected from: thresholding, machine learning based classification, clustering, region growing, deformable modeling, snaking, live-wire methods, edge detecting, and connected component detecting.

9. The program storage device of claim 8, the method further comprising:
    detecting low or zero intensity locations within the image by thresholding, wherein thresholding comprises at least one of adaptive global thresholding, non-adaptive global thresholding, local thresholding, and local adaptive thresholding.

10. The program storage device of claim 7, the method further comprising detecting locations of possible bone disease within the segmented region.

11. The program storage device of claim 7, the method further comprising building the model by extracting geometric primitives by extracting lines using at least one of a Hough transform or a Radon transform.

12. The program storage device of claim 10, wherein detecting locations of possible bone disease further comprises detecting possible locations of at least one of abnormalities, bone metastasis, fractures, osteoporosis, Shmorl's nodes, osteochondrosis, edemas, inflammation, cysts, hemangiomas, arthrosis or bone infarct.

* * * * *